(12) United States Patent
Shin et al.

(10) Patent No.: US 10,767,039 B2
(45) Date of Patent: Sep. 8, 2020

(54) THERMOPLASTIC RESIN COMPOSITION

(71) Applicant: LG CHEM, LTD., Seoul (KR)

(72) Inventors: Dong Kun Shin, Daejeon (KR); Seo Hwa Kim, Daejeon (KR); Byoung Il Kang, Daejeon (KR); Chang Hun Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 21 days.

(21) Appl. No.: 16/286,490

(22) Filed: Feb. 26, 2019

(65) Prior Publication Data

US 2019/0194445 A1  Jun. 27, 2019

Related U.S. Application Data

(63) Continuation of application No. PCT/KR2017/014133, filed on Dec. 5, 2017.

(30) Foreign Application Priority Data

Dec. 9, 2016 (KR) .................. 10-2016-0167893
Jul. 28, 2017 (KR) .................. 10-2017-0096334

(51) Int. Cl.

| | |
|---|---|
| *C08L 25/12* | (2006.01) |
| *C08L 67/02* | (2006.01) |
| *C08L 67/03* | (2006.01) |
| *C08L 55/02* | (2006.01) |
| *C08L 51/06* | (2006.01) |
| *C08F 255/02* | (2006.01) |
| *C08F 279/04* | (2006.01) |
| *C08L 53/00* | (2006.01) |
| *C08L 23/08* | (2006.01) |

(52) U.S. Cl.
CPC ............ *C08L 51/06* (2013.01); *C08F 255/02* (2013.01); *C08F 255/026* (2013.01); *C08F 279/04* (2013.01); *C08L 23/08* (2013.01); *C08L 25/12* (2013.01); *C08L 53/00* (2013.01); *C08L 53/005* (2013.01); *C08L 55/02* (2013.01); *C08L 67/02* (2013.01); *C08L 67/03* (2013.01); *C08L 23/0869* (2013.01); *C08L 2205/03* (2013.01); *C08L 2205/035* (2013.01); *C08L 2207/04* (2013.01); *C08L 2207/53* (2013.01)

(58) Field of Classification Search
CPC . C08L 55/02; C08L 2207/04; C08L 2205/035
See application file for complete search history.

(56) References Cited

FOREIGN PATENT DOCUMENTS

| | | |
|---|---|---|
| EP | 2955204 A1 | 12/2015 |
| EP | 3015507 A1 | 5/2016 |
| KR | 1020000014170 A | 3/2000 |
| KR | 1020090072829 A | 7/2009 |
| KR | 1020130067516 A | 6/2013 |
| KR | 1020130130898 A | 12/2013 |
| KR | 1020130131517 A | 12/2013 |
| WO | 2008153688 A2 | 12/2008 |

OTHER PUBLICATIONS

International Search Report issued in related PCT Application No. PCT/KR2017/014133 dated Feb. 22, 2018.
Search Report dated Nov. 22, 2019 for European Application No. 17878945.9.
Lee et al. "Preparation of Small-Sized Carboxylated Latexes by Emulsion Polymerization Using Alkali-Soluble Random Copolymer," Journal of Applied Polymer Science, John Wiley & Sons, Inc., US. vol. 69, No. 3, Dec. 7, 1998, p. 543-550, XP008110007.

*Primary Examiner* — Jeffrey C Mullis

(57) ABSTRACT

The present invention provides a thermoplastic resin and a molded article using the same, wherein the thermoplastic resin comprises: (A) 10 parts by weight to less than 30 parts by weight of a butadiene-based graft copolymer; (B) 5 parts by weight or more to less than 30 parts by weight of an acrylate-based graft copolymer; (C) 35 parts by weight to 65 parts by weight of a vinyl cyanide-aromatic vinyl-based copolymer; (D) 1 part by weight to 10 parts by weight of an ethylene-alkyl acrylate-based copolymer elastomer based on the total 100 parts by weight of (A), (B), and (C); and (E) 1 part by weight to 10 parts by weight of a polyester-based elastomer.

12 Claims, No Drawings

THERMOPLASTIC RESIN COMPOSITION

CROSS-REFERENCE TO RELATED APPLICATIONS

This application is a continuation of International Application No. PCT/KR2017/014133, filed with WIPO on Dec. 5, 2017, which claims the benefit of Korean Patent Application No. 10-2016-0167893, filed on Dec. 9, 2016, and Korean Patent Application No. 10-2017-0096334, filed on Jul. 28, 2017 in the Korean Intellectual Property Office, the disclosures of which are incorporated herein in their entirety by reference.

TECHNICAL FIELD

Technical Field

The present invention relates to a thermoplastic resin composition, and more particularly, to a thermoplastic resin composition including a butadiene-based graft copolymer resin, an acrylate-based graft copolymer resin, a vinyl cyanide-aromatic vinyl-based copolymer resin, and an elastomer resin.

Background Art

Acrylonitrile-Butadiene-Styrene (ABS) resin has excellent processability, moldability, impact resistance, strength, and gloss, thereby being widely used in various electric, electronic, and miscellaneous goods components. As the recent development direction of the use of ABS resin has changed from diversity centered on functionality to multi-functionality and complexity, the demand for resins having complex functions is gradually increasing.

In general, a portion of a connection part between an outer steel plate and an internal resin molded article of a refrigerator is assembled with a table board, a lid, a sash, and the like made by injection molding resin. Between the outer wall and the inner wall of a refrigerator assembled as such, a urethane foam layer may be formed, thereby imparting an insulation effect.

Examples of a blowing agent for such a urethane foam layer include a chlorofluorocarbon (CFC), a hydrochlorofluorocarbon (HCF), a hydrofluorocarbon (HFC), and the like. However, the use thereof is limited due to environmental concerns. Accordingly, a technology of using cyclopentane as a blowing agent to alleviate environmental regulation problems has been developed. However, there is a problem in that the blowing performance thereof is not significant so that the insulation effect is relatively reduced.

In order to solve the above problem, a blowing agent under a brand name Solstice® developed by Honeywell has been recently used. It has been reported that there are few environmental problems, and blowing efficiency is excellent. However, since Solstice® has rather high reactivity with a plastic material, there is a problem that cracks are generated after blowing.

In order to solve the above problem, a resin composition in which butadiene-based rubber and acrylate-based rubber are mixed, and a polyester-based elastomer resin is further included has been developed. However, although a lot of improvement has been made to the resin composition compared with a typical resin composition, the problem of crack generation has not been completely prevented.

Accordingly, it is required to develop a resin composition having excellent chemical resistance to the blowing agent.

DISCLOSURE OF THE INVENTION

Technical Problem

An aspect of the present invention is to provide a resin composition having excellent chemical resistance to a blowing agent, and excellent environmental stress cracking resistance (ESCR), surface gloss, and low-temperature impact properties, thereby being applicable to a thermoplastic molding component for a refrigerator.

Another aspect of the present invention is to provide a molded article manufactured using the resin composition.

Technical Solution

According to an aspect of the present invention, there is provided a resin composition comprising:
(A) 10 parts by weight to less than 30 parts by weight of a butadiene-based graft copolymer including 30 wt % to 70 wt % of a butadiene-based rubber polymer core, and 30 wt % to 70 wt % of a graft shell having a vinyl cyanide monomer-derived unit and an aromatic vinyl monomer-derived unit; (B) 5 parts by weight or more to less than 30 parts by weight of an acrylate-based graft copolymer including 30 wt % to 70 wt % of an acrylate-based rubber polymer core, and 30 wt % to 70 wt % of a graft shell having a vinyl cyanide monomer-derived unit and an aromatic vinyl monomer-derived unit; (C) 35 parts by weight to 65 parts by weight of a vinyl cyanide-aromatic vinyl-based copolymer; (D) 1 part by weight to 10 parts by weight of an ethylene-alkyl acrylate-based copolymer elastomer based on the total 100 parts by weight of the resin of (A), (B), and (C); and (E) 1 part by weight to 10 parts by weight of a polyester-based elastomer based on the total 100 parts by weight of the resin of (A), (B), and (C).

According to another aspect of the present invention, there is provided a thermoplastic resin prepared using the resin composition.

Advantageous Effects

A resin composition according an embodiment of the present invention has excellent environmental stress cracking Resistance (ESCR), and particularly, has excellent chemical resistance to a blowing agent and low-temperature impact properties, thereby being variously used for various kinds of electric, electronic, and miscellaneous goods components.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A resin composition according to an embodiment of the present invention includes (A) 10 parts by weight to less than 30 parts by weight of a butadiene-based graft copolymer resin including 30 wt % to 70 wt % of a butadiene-based rubber polymer core, and 30 wt % to 70 wt % of a graft shell having a vinyl cyanide monomer-derived unit and an aromatic vinyl monomer-derived unit; (B) 5 parts by weight or more to less than 30 parts by weight of an acrylate-based graft copolymer resin including 30 wt % to 70 wt % of an acrylate-based rubber polymer core, and 30 wt % to 70 wt % of a graft shell having a vinyl cyanide monomer-derived unit and an aromatic vinyl monomer-derived unit; (C) 35 parts by weight to 65 parts by weight of a vinyl cyanide-aromatic vinyl-based copolymer resin; (D) 1 part by weight to 10 parts by weight of an ethylene-alkyl acrylate-based copolymer elastomer resin based on the total 100 parts by weight of the resin of (A), (B), and (C); and (E) 1 part by weight to 10 parts by weight of a polyester-based elastomer resin based on the total 100 parts by weight of the resin of (A), (B), and (C).

The resin composition according to an embodiment of the present invention includes a butadiene-based graft copolymer resin, an acrylate-based graft copolymer resin, and a vinyl cyanide-aromatic vinyl-based copolymer resin, all mixed in a specific content range, and in particular, includes an ethylene-alkyl acrylate-based copolymer elastomer resin so that environmental stress cracking resistance (ESCR), surface gloss, and low-temperature impact properties thereof may be remarkably improved.

The detailed description of each of these components is as follows.

(A) Butadiene-Based Graft Copolymer Resin

In a resin composition according to an embodiment of the present invention, the butadiene-based graft copolymer resin (A) may be a copolymer resin obtained by graft copolymerizing 30 wt % to 70 wt %, specifically 35 wt % to 65 wt % of a mixture of a vinyl cyanide monomer and an aromatic vinyl monomer in the presence of 30 wt % to 70 wt %, specifically 35 wt % to 65 wt % of a butadiene-based rubber polymer.

The butadiene-based graft copolymer resin (A) may be used by purchasing a commercially available resin, or by preparing the same.

When the butadiene-based graft copolymer resin (A) is prepared and used, for example, a vinyl cyanide monomer and an aromatic vinyl monomer may be graft copolymerized in the presence of a butadiene-based rubber polymer within 3 hours and 30 minutes. At this time, the vinyl cyanide monomer may be included in the mixture of a vinyl cyanide monomer and an aromatic vinyl monomer in an amount of 20 wt % to 40 wt %, specifically 25 wt % to 35 wt %. In addition, a water-soluble initiator may be used in the polymerization reaction, and a suitable reaction temperature may be 60° C. to 80° C., specifically 65° C. to 80° C.

According to an embodiment of the present invention, a rubber polymer having an average particle diameter of 0.2 µm to 0.4 µm, specifically 0.25 µm to 0.35 µm may be used as the butadiene-based rubber polymer. When the average particle diameter of the butadiene-based rubber polymer is less than the above range, the impact strength and the environmental stress cracking resistance may be deteriorated. When greater than the above range, the manufacturing time of rubber may become longer and the gloss may be deteriorated.

A butadiene-based rubber polymer which may be used according to an embodiment of the present invention is polybutadiene, butadiene, and a copolymer with a monomer which may be copolymerized therewith (the content of butadiene in the copolymer is 50 wt % or greater). Specific examples of the monomer which may be copolymerized with butadiene may include aromatic compounds such as styrene, α-methylstyrene, and vinyltoluene, and vinyl cyanide compounds such as acrylonitrile and methacrylonitrile.

In a resin composition according to an embodiment of the present invention, a butadiene-based graft copolymer may have an average particle diameter of 0.2 µm to 0.4 µm, specifically 0.25 µm to 0.35 µm. When the average particle diameter of the butadiene-based graft polymer satisfies the above range, suitable impact strength, environmental stress cracking resistance, and vacuum moldability may be exhibited, and suitable gloss may be exhibited.

In the present invention, the butadiene-based graft copolymer resin (A) may be included in an amount of 10 parts by weight to less than 30 parts by weight, specifically 15 parts by weight to 29 parts by weight, and more specifically 20 parts by weight to 29 parts by weight based on the total 100 parts by weight of the resin of (A), (B), and (C). When the content of the butadiene-based graft copolymer resin (A) satisfies the above range, environmental stress cracking resistance higher than a certain level required in the present invention may be exhibited, and suitable fluidity may be exhibited.

(B) Acrylate-Based Graft Copolymer Resin

In a resin composition according to an embodiment of the present invention, the acrylate-based graft copolymer resin (B) may obtained by graft copolymerizing 30 wt % to 70 wt %, specifically 35 wt % to 65 wt % of a mixture of a vinyl cyanide monomer and an aromatic vinyl monomer in the presence of 30 wt % to 70 wt %, specifically 35 wt % to 65 wt % of an acrylate-based rubber polymer.

Specifically, the acrylate-based graft copolymer resin (B) is obtained by graft copolymerizing, for example, 30 wt % to 70 wt %, specifically 35 wt % to 65 wt % of a mixture of a vinyl cyanide monomer and an aromatic vinyl monomer in the presence of 30 wt % to 70 wt %, specifically 35 wt % to 65 wt % of an acrylate-based rubber polymer having an average particle diameter of 0.3 µm to 0.5 µm, specifically 0.35 µm to 0.5 µm. At this time, in the mixture, the vinyl cyanide monomer may be included in an amount of 20 wt % to 40 wt %, specifically 25 wt % to 35 wt %.

The acrylate-based rubber polymer may be prepared by, for example, simultaneously copolymerizing 0.1 parts by weight to 4 parts by weight, specifically 0.1 parts by weight to 3.5 parts by weight of a meta acrylic acid ester compound, and 0.1 parts by weight to 6 parts by weight, specifically 0.1 parts by weight to 5 parts by weight of a vinyl cyanide monomer in an acrylate monomer. As an emulsifier, an alkylsulfosuccinate metal salt having a carbon number of C12 to C18, an alkylsulfuric acid ester having a carbon number of C12 to C20, or a sulfonic acid metal salt may be used in an amount of 0.2 parts by weight to 1.0 part by weight.

Also, in the graft copolymerization, 0.5 parts by weight to 3.0 parts by weight, specifically 0.5 parts by weight to 2.5 parts by weight of a rosin acid metal salt or a carboxylic acid metal salt having a carbon number of C12 to C20 may be used as an emulsifier.

The acrylate-based rubber polymer used in the present invention may include butyl acrylate, and a meta acrylic acid ester may include, for example, ethyl methacrylate and the like. In addition, specific examples of a monomer which may be copolymerized with butyl acrylate may include aromatic compounds such as styrene, α-methylstyrene, and vinyltoluene, and vinyl cyanide compounds such as acrylonitrile and methacrylonitrile.

The acrylate-based graft copolymer may have an average particle diameter of 0.3 μm to 0.5 μm, specifically 0.35 μm to 0.5 μm. When the average particle diameter of the acrylate-based graft copolymer satisfies the above range, suitable impact strength, environmental stress cracking resistance, and vacuum moldability may be exhibited, and suitable gloss may be exhibited.

According to an embodiment of the present invention, the acrylate-based graft copolymer resin (B) may be included in an amount of 5 parts by weight or more to less than 30 parts by weight, specifically 6 parts by weight to 20 parts by weight, and more specifically 10 parts by weight to 15 parts by weight based on the total 100 parts by weight of the resin of (A), (B), and (C). If the content of the acrylate-based graft copolymer resin (B) is less than the above range, environmental stress cracking resistance may be reduced, and crack resistance required in the present invention may not be satisfied. Also, if the content of the acrylate-based graft copolymer resin (B) exceeds the above range, the molecular weight of the whole resin is decreased so that excellent vacuum moldability may not be imparted.

(C) Vinyl Cyanide-Aromatic Vinyl-Based Copolymer Resin

In a resin composition according to an embodiment of the present invention, the vinyl cyanide-aromatic vinyl-based copolymer resin (C) may be used alone, or two or more thereof having different molecular weight may be mixed and used.

According to an embodiment of the present invention, the vinyl cyanide-aromatic vinyl-based copolymer resin (C) may comprise one or more selected from the group consisting of (c1) a vinyl cyanide-aromatic vinyl-based copolymer including 25 wt % to 40 wt %, specifically 25 wt % to 38 wt % of a cyanide vinyl compound, and having a weight average molecular weight of 50,000 g/mol to 150,000 g/mol, specifically 80,000 g/mol to 150,000 g/mol, and (c2) a vinyl cyanide-aromatic vinyl-based copolymer including 20 wt % to 30 wt %, specifically 22 wt % to 28 wt % of a cyanide vinyl compound, and having a weight average molecular weight of 150,000 g/mol to 1,000,000 g/mol, specifically 150,000 g/mol to 900,000 g/mol.

The vinyl cyanide-aromatic vinyl-based copolymer resin (C) may include 0 wt % to 100 wt %, specifically 5 wt % to 95 wt % of the vinyl cyanide-aromatic vinyl-based copolymer (c1), and may include 0 wt % to 100 wt %, specifically 5 wt % to 95 wt % of the vinyl cyanide-aromatic vinyl-based copolymer (c2).

When the vinyl cyanide-aromatic vinyl-based copolymer (c1) having a weight average molecular weight less than the above range is used, environmental stress cracking resistance may be deteriorated. When the weight average molecular weight of the vinyl cyanide-aromatic vinyl-based copolymer (c2) exceeds the above range, melt viscosity is increased so that there is a problem in that the processing is difficult and appearance is deteriorated.

According to an embodiment of the present invention, 34 wt % to 66 wt %, specifically 40 wt % to 66 wt % of the vinyl cyanide-aromatic vinyl-based copolymer (c1), and 34 wt % to 66 wt %, specifically 40 wt % to 65 wt % of the vinyl cyanide-aromatic vinyl-based copolymer (c2) may be mixed and used.

The vinyl cyanide-aromatic vinyl-based copolymer resin (C) of the present invention may be included in an amount of 35 parts by weight to 65 parts by weight, specifically 40 parts by weight to 65 parts by weight based on the total 100 parts by weight of the resin of (A), (B), and (C). When the usage content of the vinyl cyanide-aromatic vinyl-based copolymer resin (C) is less than the above range, fluidity may be deteriorated, and when greater than the above range, environmental stress cracking resistance may be reduced.

(D) Ethylene-Alkyl Acrylate-Based Copolymer Elastomer Resin

A resin composition according to an embodiment of the present invention may include an ethylene-alkyl acrylate-based copolymer elastomer resin in order to further improve environmental stress cracking resistance. The ethylene-alkyl acrylate-based copolymer elastomer resin may improve chemical resistance to a blowing agent, particularly a Solstice® blowing agent.

Specifically the ethylene-alkyl acrylate-based copolymer elastomer resin may include alkyl acrylate in an amount of 3 wt % to 30 wt %. In addition, the ethylene-alkyl acrylate-based copolymer elastomer resin may have the density (ASTM D792) in a range of 0.900 g/cm$^3$ to 0.980 g/cm$^3$, and the melt index (ASTM D1238, 190, 2.16 kg) in a range of 0.5 g/10 min to 50 g/10 min, specifically 1 g/10 min to 5 g/10 min.

The ethylene-alkyl acrylate-based copolymer elastomer resin (D) according to an embodiment of the present invention may include one or more selected from the group consisting of an ethylene methyl acrylate copolymer, an ethylene ethylacrylate copolymer, and an ethylene butylacrylate copolymer.

The ethylene-alkyl acrylate-based copolymer elastomer resin (D) according to an embodiment of the present invention may be included in an amount of 1 part by weight to 10 parts by weight, specifically 2 parts by weight to 10 parts by weight, and more specifically 2.5 parts by weight to 6.5 parts by weight based on the total 100 parts by weight of the resin of (A), (B), and (C). If the content of the ethylene-alkyl acrylate-based copolymer elastomer resin (D) exceeds the above range, surface gloss may be reduced, and when less than the above range, chemical resistance, environmental stress cracking resistance, and impact strength may be reduced.

(E) Polyester-Based Elastomer Resin

A resin composition according to an embodiment of the present invention may further include a polyester-based elastomer resin.

According to an embodiment of the present invention, the polyester-based elastomer resin may be a thermoplastic copolymer obtained by block copolymerizing a crystalline hard segment (i) and a soft segment (ii). At this time, the crystalline hard segment (i) and the soft segment may be randomly block copolymerized.

At this time, the mixing ratio, which is a weight ratio, of the crystalline hard segment (i) and the soft segment (ii) may be 10:90 to 50:50, specifically 15:85 to 45:55. If the content of the crystalline hard segment is excessively smaller than that of the soft segment, the resin is too soft to be used, and if the content of the crystalline hard segment is excessively larger than that of the soft segment, the resin is too stiff so that there may be a problem in processing.

Specifically, the crystalline hard segment (i) may include a polyester compound as a main component which includes an ester group formed by a condensation reaction of aromatic dicarboxylic acid and a derivative thereof with aliphatic diol, or an ester group formed by a condensation reaction of a derivative of aromatic dicarboxylic acid and aliphatic diol.

Examples of the aromatic dicarboxylic acid may include terephthalic acid (TPA), isophthalic acid (IPA), 2,6-butanediol dicarboxylic acid (2,6-NDCA), 1,5-naphthalene dicarboxylic acid (1,5-NDCA), or 1,4-cyclohexane dicarboxylic acid (1,4-CHDA). Examples of the derivative of aromatic dicarboxylic acid may include an aromatic dicarboxylate compound in which hydrogen of a –COOH group is substituted with a methyl group, for example, dimethyl terephthalate (DMT), dimethyl isophthalate (DMI), 2,6-dimethyl naphthalene dicarboxylate (2,6-NDC), dimethyl 1,4-cyclohexanedimethanol (2,6-NDC), dimethyl 1,4-cyclohexanedimethanol (DMCD) or a mixture thereof. Preferably, the derivative of the aromatic dicarboxylic acid is DMT.

In addition, the aromatic dicarboxylic acid and the derivative thereof may be used in an amount of 10 wt % to 55 wt %, specifically 15 wt % to 50 wt % based on the total content of the polyester-based elastomer resin. If the content of the aromatic dicarboxylic acid and the derivative thereof is out of the above range, the overall condensation reaction balance is not met so that the condensation copolymerization reaction may not proceed well.

In addition, examples of the aliphatic diol may include an aliphatic diol compound having a molecular weight of 300 or less, for example, may be one or more selected from the group consisting of ethylene glycol, propylene glycol, 1,2-propanediol, 1,3-propanediol, 1,4-butanediol, 1,5-pentanediol, 1,6-hexanediol and 1,4-cyclohexanedimethanol. Preferably, 1,4-butanediol may be used.

The aliphatic diol may be used in an amount of 10 wt % to 30 wt %, specifically 15 wt % to 25 wt % based on the total content of the polyester-based elastomer resin. If the content of the aliphatic diol is out of the range, the overall condensation reaction balance is not obtained so that the condensation copolymerization reaction may not proceed well.

In addition, the soft segment (ii) may include a polyalkylene oxide compound as a main component which includes an ether group formed by an additional reaction.

In addition, the polyalkylene oxide compound including an ether group may include an aliphatic polyether compound. Specific examples of such polyether compound may include polyoxyethylene glycol, polyoxypropylene glycol, polyoxytetramethylene glycol (PTMEG), polyoxyhexamethylene glycol, a copolymer of an ethylene oxide and a propylene oxide, an additional polymer of an ethylene oxide and polypropylene oxide glycol, and a copolymer of an ethylene oxide and tetrahydrofuran. Of these, it is preferable to use polyoxytetramethylene glycol PTMEG having a number average molecular weight in a range of 600 to 3,000, or polypropylene oxide glycol having a number average molecular weight of 2,000 to 3,000 and whose end is capped with an ethylene oxide.

The hardness (shore hardness D; shore D) of the polyester-based elastomer resin (E) may be determined by the content of a polyalkylene oxide, which is included as a main component of the soft segment. That is, the polyalkylene oxide is used in an amount of 40 wt % to 80 w%, specifically 45 wt % to 80 wt % based on the total content of the polyester-based elastomer resin. If the polyalkylene oxide is included in an amount less than the above range, the hardness of a resin composition finally prepared is high so that flexibility may be reduced, and if included in an amount exceeding the above range, due to the problem of compatibility between a hard segment and aliphatic polyether, the condensation polymerization reaction may not proceed well.

Meanwhile, the polyester-based elastomer resin (E) may be prepared by a primary melt condensation polymerization, or may be prepared in the form of a block copolymer of high polymerization degree having a lower melt index through a secondary solid polymerization.

Specifically the polyester-based elastomer resin (E) may be prepared as follows. In the presence of titanium butoxide (TBT) which is a catalyst, aromatic dicarboxylic acid and aliphatic diol which are the main components of the crystalline hard segment (i), and a polyalkylene oxide which is the main component of the soft segment (ii) are subjected to an ester exchange reaction as starting materials at a temperature of about 140° c to 215° c for 120 minutes to prepare a Bis (4-hydroxy butyl) terephthalate oligomer (BHBT). Subsequently, titanium butoxide (TBT) which is a catalyst is reintroduced into the oligomer, and a polycondensation reaction is performed under a temperature condition of about 215° c to 245° c for about 120 minutes. At this time, the polycondensation reaction is performed as a process in which the pressure is reduced from 760 torr to 0.3 torr in stages. The polycondensation reaction is subjected to melt polymerization until a desired flow index (MFI) is reached according to ASTM D-1238. Next, after the completion of the reaction, a reactant is discharged in the reactor with nitrogen pressure, and pelletized through pelletizing of a strand. The polyester-based elastomer resin finally obtained by this procedure has a melting point of 130° c to 220° c, preferably, 140° c to 210° c, and has a melt index of 5 g/min to 30 g/min at 230° c, 2.16 Kg.

According to an embodiment of the present invention, in the polyester-based elastomer resin (E), the crystalline hard segment (i) may include polybutylterephthalate, and the soft segment (ii) may include polytetramethyleneoxide glycol. In addition, as aromatic dicarboxylic acid, Keyflex BT 2140D (LG Chemical Co., Ltd.) having a hardness of 40D, or Keyflex BT 1172D (LG Chemical Co., Ltd.) having a hardness of 70D, both of which are comprised by terephthalate as an aromatic dicarboxylic acid, 1,4-butanediol as aliphatic diol, and polyoxytetramethylene glycol as an aliphatic polyether compound may be used.

Also, according to an embodiment of the present invention, the polyester-based elastomer resin (E) may be included in an amount of 1 part by weight to 10 parts by weight, specifically 1.5 parts by weight to 9 parts by weight, and more specifically 2 parts by weight to 6 parts by weight based on the total weight of the resin of (A), (B), and (C).

In addition, according to an embodiment of the present invention, the mixing ratio of the polyester-based elastomer resin (E) and the ethylene-alkyl acrylate-based copolymer elastomer resin (D) may be in a range of 1:1 to 1:10 weight ratio, specifically 1:1 to 1.5 weight ratio, and more specifically 1:1 to 1:3 weight ratio. When the above range of the mixing ratio of elastomer resin is satisfied, environmental stress cracking resistance, surface gloss, and impact strength may be excellent. If the ethylene-alkyl acrylate-based copolymer elastomer resin (D) is used in an amount less than the polyester-based elastomer resin (E), environmental stress cracking resistance and surface gloss is reduced, so that it may not be desirable.

In addition, a resin composition according to an embodiment of the present invention may be added with other additives such as an active agent, a lubricant, a release agent, a light and an ultraviolet stabilizer, a flame retardant, an antistatic agent, a colorant, a filler, and an impact modifier as needed without departing the scope of the present invention, and other resins or other rubber components may be used together.

A thermoplastic resin prepared by a resin composition according to an embodiment of the present invention may include a resin, a resin composition, or a component of the resin composition included by the resin composition according to an embodiment of the present invention. That is, a thermoplastic resin prepared by a resin composition according to an embodiment of the present invention may include: 10 parts by weight to less than 30 parts by weight of a butadiene-based graft copolymer resin including 30 wt % to 70 wt % of a butadiene-based rubber polymer core, and 30 wt % to wt % of a graft shell having a vinyl cyanide monomer-derived unit and an aromatic vinyl monomer-derived unit; (B) 5 parts by weight or more to less than 30 parts by weight of an acrylate-based graft copolymer resin including 30 wt % to 70 wt % of an acrylate-based rubber polymer core, and 30 wt % to 70 wt % of a graft shell having a vinyl cyanide monomer-derived unit and an aromatic vinyl monomer-derived unit; (C) 35 parts by weight to 65 parts by weight of a vinyl cyanide-aromatic vinyl-based copolymer resin; (D) 1 part by weight to parts by weight of an ethylene-alkyl acrylate-based copolymer elastomer resin based on the total 100 parts by weight of the resin of (A), (B), and (C); and (E) 1 part by weight to 10 parts by weight of a polyester-based elastomer resin based on the total 100 parts by weight of the resin of (A), (B), and (C). The thermoplastic resin prepared by a resin composition according to an embodiment of the present invention may have a tensile strength of 360 kgf/cm$^2$ or more in the machine direction (MD) as measured according to ASTM D638 (50 mm/min), a tensile elongation (TE) retention rate of 60% or more (MD) before and after the ESCR test, that is, a retention rate before and after the environmental stress cracking resistance (ESCR) test, which is obtained by measuring a tensile strength and an elongation rate after being dipped in a solution of Solstice® LBA (a blowing agent of Honeywell), a TE retention rate of 40% or more in the transverse direction (TD) before and after the ESCR test, a surface gloss of 70% or more as measured at an angle of 60° according to the method of ASTM D2457, and a low-temperature IZOD impact strength of 14.5 kgf·cm/cm or more as measured according to ASTM D256.

In addition, specifically, a thermoplastic resin prepared by a resin composition according to an embodiment of the present invention may have a tensile strength of 380 to 450 kgf/cm$^2$ as measured according to ASTM D638 (50 mm/min), a TE retention rate of 80% or more (MD) before and after the ESCR test, a TE retention rate of 50% or more (TD) before and after the ESCR test, a surface gloss of 80% or more as measured at an angle of 60° according to the method of ASTM D2457, a low-temperature IZOD impact strength of 15.0 kgf·cm/cm to 20.0 kgf·cm/cm as measured according to ASTM D256.

In addition, the present invention may provide a molded article manufactured using a resin composition according to an embodiment of the present invention.

The molded article is not particularly limited as long as it may be made of plastic. Specific examples thereof may include a housing of a display product, a mobile phone, a notebook computer, a refrigerator and the like, or various plastic parts and the like. In particular, the molded article has excellent chemical resistance and low-temperature impact strength properties to a Solstice® blowing agent, thereby being usefully used for a refrigerator extrusion sheet.

Hereinafter, the present invention will now be described in more detail referring to examples and experimental examples in order to assist the understanding of the present invention. However, the following examples and experimental examples are only for illustrating the present invention and the scope of the present invention is not limited thereto.

EXAMPLE 1

<Preparation of a Resin Composition>

A resin composition was prepared using the components and the content shown in Table 1 below.

Specifically, 26 parts by weight of the butadiene-based graft copolymer resin (A) having an average particle diameter of about 0.2 μm to 0.4 μm, 10 parts by weight of the acrylate-based graft copolymer resin (B) having an average particle diameter of about 0.3 μm to 0.5 μm, and 64 parts by weight of the vinyl cyanide-aromatic vinyl-based copolymer resin (C) were used. In addition, based on 100 parts by weight of the resin, 4 parts by weight of the ethylene-alkyl acrylate-based copolymer elastomer resin (D), and 4 parts by weight of the polyester-based elastomer resin (E) were mixed therein to prepare a resin composition.

<Preparation of a Specimen>

The resin composition was melted, kneaded, and extruded to prepare a pellet. The extrusion was performed using a biaxial extruder having an L/D=29 and a diameter of 40 mm, and a cylinder temperature was set at 230° C. The prepared pellet was injection molded to produce a physical properties specimen, and the physical properties thereof was measured. The results are shown in Table 2 and Table 3.

EXAMPLES 2 AND 3

A resin composition and a specimen were prepared by the same method as described in Example 1 except that the resin composition was prepared using the content and the components shown in Table 1 below.

COMPARATIVE EXAMPLES 1 TO 10

A resin composition and a specimen were prepared by the same method as described in Example 1 except that the resin composition was prepared using the content and the components shown in Table 1 below.

In Table 1 below, the content of 0 means that the component was not used.

TABLE 1

| Component | Example 1 (wt %) | Example 2 (wt %) | Example 3 (wt %) | Component | Comparative Example 1 (wt %) | Comparative Example 2 (wt %) | Comparative Example 3 (wt %) |
|---|---|---|---|---|---|---|---|
| (A) | 26 | 29 | 20 | (A) | 26 | 34 | 22 |
| (B) | 10 | 11 | 15 | (B) | 10 | 0 | 10 |
| (C) | 64 | 60 | 65 | (C) | 64 | 66 | 68 |
| (D) | 4 | 5 | 4 | (D) | 0 | 5 | 5 |
| (E) | 4 | 2.5 | 4 | (E) | 5 | 2.5 | 2.5 |

TABLE 1-continued

| Component | Comparative Example 4 (wt %) | Comparative Example 5 (wt %) | Comparative Example 6 (wt %) | Comparative Example 7 (wt %) | Comparative Example 8 (wt %) | Comparative Example 9 (wt %) | Comparative Example 10 (wt %) |
|---|---|---|---|---|---|---|---|
| (A) | 30 | 32 | 30 | 32 | 26 | 32 | 13 |
| (B) | 5 | 3 | 5 | 3 | 10 | 10 | 25 |
| (C) | 65 | 65 | 65 | 65 | 64 | 58 | 62 |
| (D) | 3 | 5 | 3 | 5 | 10 | 4 | 4 |
| (E) | 0 | 0 | 2.5 | 2.5 | 0 | 4 | 4 |

(A) Butadiene-based graft copolymer: Average particle diameter of 0.2 to 0.4 μm (DP 270, LG Chemical)
(B) Acrylate-based graft copolymer: Average particle diameter of 0.3 to 0.5 μm (SA 927, LG Chemical)
(C) Vinyl cyanide-aromatic vinyl-based copolymer (SAN resin): 97HC (LG Chemical)
(D) Ethylene-alkyl acrylate-based copolymer elastomer (Elvaloy® 1224 AC, Dupont)
(E) Polyester-based elastomer (Keflex, LG Chemical)

EXPERIMENTAL EXAMPLE

The physical properties of the specimens prepared by Examples and Comparative Examples were evaluated by the following methods, and the results are shown in Table 2.

(1) Tensile strength (MD) of extrusion sheet: A tensile strength at break was measured according to ASTM D638 (50 mm/min)

(2) Environmental stress cracking resistance (hereinafter, referred to as ESCR): The prepared tensile specimens were hung on a bending jig of 0.7% strain and loaded in a solution of Solstice® LBA (a blowing agent of Honeywell) for 15 seconds. 2 minutes after the loading, and after evaporation, the hung specimens were taken out and a tensile strength and an elongation thereof were measured to compare a retention rate before and after the test.

(3) IZOD impact strength (kgf·cm/cm): The specimens were placed in a chamber of −30° C. for 20 hours, and an IZOD impact strength was measured according to the method of ASTM D256. The thickness of the specimen was ¼".

(4) Surface gloss (%): Measured at an angle of 60° according to the method of ASTM D2457.

TABLE 2

| Evaluation | Example 1 | Example 2 | Example 3 | Comparative Example 1 | Comparative Example 2 | Comparative Example 3 |
|---|---|---|---|---|---|---|
| Extrusion sheet tensile strength (MD) | 408 | 381 | 423 | 425 | 414 | 446 |
| TE retention rate before/after ESCR test (MD) | 100% | 100% | 92.1% | 10.1 | 38.8 | 50.2 |
| TE retention rate before/after ESCR test (TD) | 61.8% | 78.3% | 60.3% | 11.7 | 23.5 | 31.1 |
| Surface gloss (60°) | 88.9% | 89.1% | 87.2% | 90.3% | 89.1% | 89.3% |
| Low-temperature IZOD impact strength (kgf·cm/cm) | 15.8 | 18.3 | 15.1 | 14.2 | 17.1 | 12.7 |

| Evaluation | Comparative Example 4 | Comparative Example 5 | Comparative Example 6 | Comparative Example 7 | Comparative Example 8 | Comparative Example 9 | Comparative Example 10 |
|---|---|---|---|---|---|---|---|
| Extrusion sheet tensile strength (MD) | 432 | 421 | 423 | 411 | 388 | 358 | 398 |
| TE retention rate before/after ESCR test (MD) | 10.8% | 11.5% | 15.1% | 29.4% | 100% | 100% | 100% |
| TE retention rate before/after ESCR test (TD) | 8.5% | 9.4% | 10.7% | 18.7% | 64.4% | 80.2% | 76.1% |

TABLE 2-continued

| Surface gloss (60°) | 89.1% | 89.3% | 89.0% | 89.5% | 66.1% | 88.2% | 83.2% |
|---|---|---|---|---|---|---|---|
| Low-temperature IZOD impact strength (kgf·cm/cm) | 15.2 | 15.4 | 15.6 | 15.2 | 15.5 | 18.8 | 13.3 |

As can be seen in Table 2, when the resin compositions of Examples 1 to 3 of the present invention were used, the extrusion sheet tensile strength, the TE retention rate before/after the ESCR test, the surface gloss, and the low-temperature IZOD impact strength were all excellent.

On the contrary, in the cases of Comparative Examples 1 to 7, the TE retention rate before/after the ESCR test were not good both in the MD direction and in the TD direction. In the case of Comparative Example 8, the surface gloss was not good, and in the cases of Comparative Examples 9 and 10, the extrusion sheet tensile strength and the low-temperature IZOD impact strength were not good, respectively.

Specifically when the ethylene-alkyl acrylate-based copolymer elastomer (D) was not included (Comparative Example 1), and when the vinyl cyanide-aromatic vinyl-based copolymer (C) was used in excess (Comparative Example 3), the TE retention rate before/after the ESCR test and the low-temperature IZOD impact strength were not good.

In addition, when the butadiene-based graft copolymer (A) was used in excess while the acrylate-based graft copolymer (B) was not used (Comparative Example 2), when the acrylate-based graft copolymer (B) was used in an undersized amount (Comparative Examples 6 and 7), and when the butadiene-based graft copolymer (A) was used in excess while the acrylate-based graft copolymer (B) was used in an undersized amount, and the polyester-based elastomer (E) was not used (Comparative Examples 4 and 5), the TE retention rate before/after the ESCR test was not good.

In addition, when the polyester-based elastomer (E) was not used (Comparative Example 8), the surface gloss was deteriorated.

Meanwhile, when the butadiene-based graft copolymer (A) was used in excess (Comparative Example 9), the extrusion sheet tensile strength was low, and when the acrylate-based graft copolymer (B) was used in excess (Comparative Example 10), the low-temperature IZOD impact strength was not good.

Accordingly, it could be confirmed that only when all the resins (A) to (E) were included and when the content of each resin satisfied the specific range according to the present invention, a final resin satisfying the desired range of the present invention could be prepared.

The invention claimed is:

1. A resin composition comprising:
   (A) 10 parts by weight to less than 30 parts by weight of a butadiene-based graft copolymer including 30 wt % to 70 wt % of a butadiene-based rubber polymer core, and 30 wt % to 70 wt % of a graft shell having a vinyl cyanide monomer-derived unit and an aromatic vinyl monomer-derived unit;
   (B) 5 parts by weight or more to less than 30 parts by weight of an acrylate-based graft copolymer including 30 wt % to 70 wt % of an acrylate-based rubber polymer core, and 30 wt % to 70 wt % of a graft shell having a vinyl cyanide monomer-derived unit and an aromatic vinyl monomer-derived unit;
   (C) 35 parts by weight to 65 parts by weight of a vinyl cyanide-aromatic vinyl-based copolymer;
   (D) 1 part by weight to 10 parts by weight of an ethylene-alkyl acrylate-based copolymer elastomer based on the total 100 parts by weight of (A), (B), and (C); and
   (E) 1 part by weight to 10 parts by weight of a polyester-based elastomer.

2. The resin composition of claim 1, wherein the ethylene-alkyl acrylate-based copolymer elastomer comprises one or more selected from the group consisting of an ethylene methylacrylate copolymer, an ethylene ethylacrylate copolymer, and an ethylene butylacrylate copolymer.

3. The resin composition of claim 1, wherein the resin composition comprises the polyester-based elastomer (E) and the ethylene-alkyl acrylate-based copolymer elastomer (D) in a weight ratio of 1:1 to 1:10.

4. The resin composition of claim 1, wherein the resin composition comprises the polyester-based elastomer (E) and the ethylene-alkyl acrylate-based copolymer elastomer (D) in a weight ratio of 1:1 to 1:3.

5. The resin composition of claim 1, wherein the resin composition comprises 1 part by weight to 10 parts by weight of a mixture of the polyester-based elastomer (E) and the ethylene-alkyl acrylate-based copolymer elastomer (D) based on the total 100 parts by weight of (A), (B), and (C).

6. The resin composition of claim 1, wherein the polyester-based elastomer is a thermoplastic copolymer in which a crystalline hard segment (i) and a soft segment (ii) are block copolymerized.

7. The resin composition of claim 6, wherein the polyester-based elastomer comprises the crystalline hard segment (i) and the soft segment (ii) in a weight ratio of 10: 90 to 50:50.

8. The resin composition of claim 6, wherein the crystalline hard segment comprises polybutylterephthalate, and the soft segment comprises polytetramethyleneoxide glycol.

9. The resin composition of claim 1, wherein the butadiene-based graft copolymer has an average particle diameter ($D_{50}$) of 0.2 μm to 0.4 μm, and the acrylate-based graft copolymer has an average particle diameter ($D_{50}$) of 0.3 μm to 0.5 μm.

10. The resin composition of claim 1, wherein the vinyl cyanide-aromatic vinyl-based copolymer (C) comprises at least one of:
   (c1) a vinyl cyanide-aromatic vinyl-based copolymer including 25 wt % to 40 wt % of a vinyl cyanide monomer-derived unit and having a weight average molecular weight of 50,000 g/mol to 150,000 g/mol; and
   (c2) a vinyl cyanide-aromatic vinyl-based copolymer including 20 wt % to 30 wt % of a vinyl cyanide monomer-derived unit and having a weight average molecular weight of 150,000 g/mol to 1,000,000 g/mol.

11. A thermoplastic resin prepared using the resin composition of claim 1 having:

a tensile strength in a machine direction(MD) of 360 kgf/cm$^2$ or more as measured according to ASTM D638 (50 mm/min),
a TE retention rate (MD) of 60% or more before and after the ESCR test,
a TE retention rate (TD) of 40% or more before and after the ESCR test,
a surface gloss of 70% or more measured at an angle of 60° according to ASTM D2457, and
a low-temperature IZOD impact strength of 14.5 kgf·cm/cm or more measured according to ASTM D256.

12. The thermoplastic resin of claim 11, wherein the thermoplastic resin has:
a tensile strength in a machine direction (MD) of 380 to 450 kgf/cm$^2$ as measured according to ASTM D638 (50 mm/min),
a TE retention rate (MD) of 80% or more before and after the ESCR test,
a TE retention rate (TD) of 50% or more before and after the ESCR test,
a surface gloss of 80% or more measured at an angle of 60° according to ASTM D2457, and
a low-temperature IZOD impact strength of 15.0 kgf·cm/cm to 20.0 kgf·cm/cm as measured according to ASTM D256.

* * * * *